United States Patent
Smith

(10) Patent No.: US 7,089,116 B2
(45) Date of Patent: Aug. 8, 2006

(54) USER-CENTRIC EVENT REPORTING

(75) Inventor: Michael R. Smith, Wichita, KS (US)

(73) Assignee: User-Centric IP, L.P., PA (US)

( * ) Notice: Subject to any disclaimer, the term of this patent is extended or adjusted under 35 U.S.C. 154(b) by 0 days.

(21) Appl. No.: 10/969,915

(22) Filed: Oct. 22, 2004

(65) Prior Publication Data
US 2005/0086004 A1    Apr. 21, 2005

Related U.S. Application Data

(63) Continuation of application No. 10/386,437, filed on Mar. 13, 2003, now Pat. No. 6,845,324.

(51) Int. Cl.
*G01W 1/00* (2006.01)

(52) U.S. Cl. ........................................ 702/3

(58) Field of Classification Search ............... 702/2, 702/3, 4, 5; 342/26; 340/601, 539.13, 539.17, 340/539.2, 628
See application file for complete search history.

(56) References Cited

U.S. PATENT DOCUMENTS

| | | |
|---|---|---|
| 5,355,140 A | 10/1994 | Slavin et al. |
| 5,508,930 A | 4/1996 | Smith, Jr. |
| 5,628,050 A | 5/1997 | McGraw et al. |
| 5,699,056 A | 12/1997 | Yoshida |
| 5,724,255 A * | 3/1998 | Smith et al. .................. 700/266 |
| 5,848,373 A | 12/1998 | DeLorme et al. |
| 5,867,110 A | 2/1999 | Naito et al. |
| 5,914,675 A | 6/1999 | Tognazzini |
| 5,959,567 A | 9/1999 | Wolfson et al. |
| 5,991,687 A | 11/1999 | Hale et al. |
| 6,009,374 A | 12/1999 | Urahashi |
| 6,018,699 A | 1/2000 | Baron, Sr. et al. |
| 6,031,455 A | 2/2000 | Grube et al. |
| 6,084,510 A | 7/2000 | Lemelson et al. |
| 6,112,074 A | 8/2000 | Pinder |
| 6,125,328 A | 9/2000 | Baron et al. |
| 6,154,699 A | 11/2000 | Williams |

(Continued)

FOREIGN PATENT DOCUMENTS

CA    2158335    3/1996

OTHER PUBLICATIONS

Maptech Pocket Navigator, printed from http://www.maptech.com/products/PocketNavigator/index.cfm on May 29, 2003, 19 pages.

(Continued)

*Primary Examiner*—Donald McElheny, Jr.
(74) *Attorney, Agent, or Firm*—Banner & Witcoff, Ltd.

(57) ABSTRACT

The invention provides a system and method for receiving weather forecast information in a mobile unit and using that information to warn a user of a future weather hazard with reference to the mobile unit's location and/or intended direction of travel. A hazard location algorithm compares a forecast location of each mobile unit with a forecast hazard and transmits a warning to each mobile unit that is predicted to encounter the hazard. As the mobile unit moves, its actual position is updated in the forecasting center, and a revised warning is transmitted to the mobile unit. The hazard information may be displayed on the user's system in the form of a rotating map with an automatically adjustable range to display warning information in relation to the system's location. Warnings, including audio warnings for playback and crawls for display on a television, can be automatically generated and spoken or displayed to a user.

62 Claims, 11 Drawing Sheets

U.S. PATENT DOCUMENTS

| | | | |
|---|---|---|---|
| 6,167,255 | A | 12/2000 | Kennedy, III et al. |
| 6,198,390 | B1 | 3/2001 | Schlager et al. |
| 6,199,045 | B1 | 3/2001 | Giniger et al. |
| 6,240,365 | B1 | 5/2001 | Bunn |
| 6,252,544 | B1 | 6/2001 | Hoffberg |
| 6,255,953 | B1 | 7/2001 | Barber |
| 6,289,331 | B1 | 9/2001 | Pedersen et al. |
| 6,295,001 | B1 | 9/2001 | Barber |
| 6,304,816 | B1 * | 10/2001 | Berstis ............... 701/117 |
| 6,351,218 | B1 * | 2/2002 | Smith ............... 340/601 |
| 6,405,134 | B1 | 6/2002 | Smith et al. |
| 6,429,812 | B1 | 8/2002 | Hoffberg |
| 6,505,123 | B1 | 1/2003 | Root et al. |
| 6,542,825 | B1 * | 4/2003 | Jones et al. ............... 702/3 |
| 6,574,561 | B1 * | 6/2003 | Alexander et al. ......... 702/5 |
| 6,581,009 | B1 | 6/2003 | Smith |
| 6,603,405 | B1 | 8/2003 | Smith |
| 6,646,559 | B1 | 11/2003 | Smith |
| 6,845,324 | B1 | 1/2005 | Smith |
| 6,947,842 | B1 | 9/2005 | Smith et al. |
| 6,963,853 | B1 | 11/2005 | Smith |
| 2002/0042846 | A1 * | 4/2002 | Bottan et al. ............ 709/249 |
| 2002/0188522 | A1 * | 12/2002 | McCall et al. ............ 705/26 |
| 2003/0004780 | A1 | 1/2003 | Smith |
| 2004/0049345 | A1 * | 3/2004 | McDonough et al. ...... 702/12 |
| 2005/0197775 | A1 | 9/2005 | Smith |
| 2005/0240378 | A1 | 10/2005 | Smith et al. |
| 2006/0015254 | A1 | 1/2006 | Smith |

OTHER PUBLICATIONS

Maptech Outdoor Navigator, printed from http://www.maptech.com/products/OutdoorNavigator/index.cfm on May 29, 2003, 8 pages.

TELETYPE GPS, WorldNavigator, 2002, 2 pages.

TeleType GPS—Street Level Maps, printed from http://www.teletype.com/pages/gps/street.html printed on May 29, 2003, 4 pages.

Microsoft Streets & Trips 2003, printed from http://www.microsoft.com/streets printed on May 29, 2003, 11 pages.

Navigation Solutions, printed from http://hertzneverlost.com on May 29, 2003, 7 pages.

Control Vision, printed from http:///www.anywheremap.com on May 29, 2003, 6 pages.

U.S. Appl. No. 11/052,295, Michael R. Smith.

* cited by examiner

|  |  |  |  |  |  |  |  |
|---|---|---|---|---|---|---|---|
| $W_0$ | $W_{10}$ | $W_{20}$ | $W_{30}$ |  |  |  |  |
| $W_0$ | $W_{10}$ | $W_{20}$ | $W_{30}$ | $V_{30}$ | $V_{20}$ | $V_{10}$ | $V_0$ |
| $W_0$ | $W_{10}$ | $W_{20}$ | $W_{30}$ |  |  |  |  |
| $W_0$ | $W_{10}$ | $W_{20}$ | $W_{30}$ |  |  |  |  |

FIG. 3A

|  |  |  |  |  |  |  |  |
|---|---|---|---|---|---|---|---|
| $W_0$ | $W_0$ | $W_{10}$ | $W_{20}$ | $W_{30}$ |  |  |  |
| $W_0$ | $W_0$ | $W_{10}$ | $W_{20}$ | $W_{30}$ |  |  |  |
|  |  |  | $V_{30}$ | $V_{20}$ | $V_{10}$ | $V_0$ |  |
| $W_0$ | $W_0$ | $W_{10}$ | $W_{20}$ | $W_{30}$ |  |  |  |
| $W_0$ | $W_0$ | $W_{10}$ | $W_{20}$ | $W_{30}$ |  |  |  |

FIG. 3B

|  |  |  |  |  |  |  |  |
|---|---|---|---|---|---|---|---|
| $W_0$ | $W_0$ | $W_0$ | $W_{10}$ | $W_{20}$ | $W_{30}$ |  |  |
|  | $W_0$ | $W_0$ | $W_{10}$ | $W_{20}$ | $W_{30}$ |  |  |
|  |  | $V_{30}$ | $V_{20}$ | $V_{10}$ | $V_0$ |  |  |
| $W_0$ | $W_0$ | $W_0$ | $W_{10}$ | $W_{20}$ | $W_{30}$ |  |  |
| $W_0$ | $W_0$ | $W_0$ | $W_{10}$ | $W_{20}$ |  |  |  |

FIG. 3C

| | $W_0$ | $W_0$ | $W_0$ | $W_{10}$ | $W_{20}$ | $W_{30}$ | |
| --- | --- | --- | --- | --- | --- | --- | --- |
| | | $W_0$ | $W_0$ | $W_{10}$ | $W_{20}$ | $W_{30}$ | |
| | $V_{30}$ | $V_{20}$ | $V_{10}$ | $V_0$ | | | |
| | $W_0$ | $W_0$ | $W_0$ | $W_{10}$ | $W_{20}$ | $W_{30}$ | |
| | $W_0$ | $W_0$ | $W_0$ | $W_{10}$ | $W_{20}$ | $W_{30}$ | |

FIG. 3D

| | | $W_0$ | $W_0$ | $W_0$ | $W_{10}$ | $W_{20}$ | $W_{30}$ |
| --- | --- | --- | --- | --- | --- | --- | --- |
| | | | $W_0$ | $W_0$ | $W_{10}$ | $W_{20}$ | $W_{30}$ |
| $V_{30}$ | $V_{20}$ | $V_{10}$ | $V_0$ | | | | |
| | | | $W_0$ | $W_0$ | $W_{10}$ | $W_{20}$ | $W_{30}$ |
| | | | $W_0$ | $W_0$ | $W_{10}$ | $W_{20}$ | $W_{30}$ |

FIG. 3E

| | | | | $W_0$ | $W_0$ | $W_0$ | $W_{10}$ | $W_{20}$ |
| --- | --- | --- | --- | --- | --- | --- | --- | --- |
| $V_{20}$ | $V_{10}$ | $V_0$ | | | $W_0$ | $W_0$ | $W_{10}$ | $W_{20}$ |
| | | | | $W_0$ | $W_0$ | $W_0$ | $W_{10}$ | $W_{20}$ |
| | | | | $W_0$ | $W_0$ | $W_0$ | $W_{10}$ | $W_{20}$ |

FIG. 3F

| | | | | | | | |
|---|---|---|---|---|---|---|---|
| | | $W_0$ | $W_{10}$ | $W_{20}$ | | | |
| | | $W_0$ | $W_{10}$ $V_{30}$ | $W_{20}$ $V_{20}$ | | | |
| | | $W_0$ | $W_0$ | $W_0$ | $V_{10}$ | | |
| | | | | | | $V_0$ | |

FIG. 4A

| | | | | | | | |
|---|---|---|---|---|---|---|---|
| | | $W_0$ | $W_{10}$ | $W_{20}$ | | | |
| | | $W_0$ $V_{30}$ | $W_{10}$ $V_{20}$ | $W_{20}$ $V_{10}$ | | | |
| | | $W_0$ | $W_0$ | $W_0$ | $W_{10}$ $V_{10}$ | | |
| | | | | | | | |

FIG. 4B

| | | | | | | | |
|---|---|---|---|---|---|---|---|
| | | $W_0$ | $W_0$ | $W_{10}$ | $W_{20}$ | | |
| | | $W_0$ | $W_{10}$ $V_{10}$ | $W_{20}$ $V_0$ | $W_0$ | | |
| | | $V_{20}$ | | | | | |
| | $V_{30}$ | | | | | | |

FIG. 4C

USER-CENTRIC EVENT REPORTING

CROSS-REFERENCE TO RELATED CASES

The present application is a continuation of application Ser. No. 10/386,437, filed Mar. 13, 2003 now U.S. Pat. No. 6,845,324, entitled Rotating Map And User-Centric Weather Prediction.

FIELD OF THE INVENTION

The present invention relates generally to weather forecasting and warning systems. More particularly, the invention provides a method and apparatus for receiving weather forecast information in a vehicle and using that information to warn a vehicle operator of a future weather hazard with respect to the specific vehicle's intended direction of travel.

BACKGROUND OF THE INVENTION

Vehicle operators, such as automobile drivers, frequently tune to radio stations while traveling in order to obtain weather forecast information. Such forecasts generally cover a large geographic area, such as an entire county or a multi-county region, and can provide some indication to the vehicle operator of likely weather trouble, such as a flash flood or tornado. Because they cover such large areas, however, generalized weather forecasts may cause wasteful evasive action by drivers not realistically at risk. For example, if the National Weather Service issues a flash flood warning for an entire county, all drivers in the county may need to heed the warning, even if the flood areas make up only a small part of the county.

Similarly, if a sudden snowstorm approaches from the west, a large number of drivers may take evasive action based on a general weather forecast for cities in the path of the approaching storm. Depending on where the drivers are relative to the weather hazard, some drivers may feel the effects of the storm shortly after the warning, while others may not be in the path of the storm for 10, 20, or even 30 minutes. Providing drivers with more accurate and vehicle-specific weather forecasts could result in substantial time and energy savings. For example, if a driver is heading West and is projected to arrive at his destination within 20 minutes, it would be helpful to know that the storm will not arrive at the intended destination for another 30 minutes. Such a system would be particularly useful for fleets of commercial trucks or buses, for example, particularly since such vehicles may be more susceptible to causing injury or property damage during severe weather events (e.g., snow, ice storms, and the like).

Various position-sensitive automated vehicle systems have been proposed. For example, U.S. Pat. No. 5,991,687 ("System and Method for Communicating Information Related to a Geographic Area") describes a system for displaying the location of a vehicle to the vehicle operator, along with other information such as a weather map. However, the system cannot provide the sort of information that would permit a vehicle operator to determine whether he or she was likely to encounter a weather hazard and for how long such a hazard might last.

Another system, disclosed in U.S. Pat. No. 6,009,374 ("Apparatus for and Method of Controlling Vehicular Systems While Travelling"), assists a vehicle operator by automatically controlling the vehicle in response to various detected conditions and an intended travel position. One variation of the system extracts current weather information and uses the information to sound an alarm. The system, however, does not provide predicted weather information to the vehicle operator; it does not provide hazard duration information; and it does not provide weather information tailored to the particular vehicle. Consequently, the system does not solve the aforementioned problems.

Yet another system, described in U.S. Pat. No. 6,018,699 ("Systems and Methods for Distributing Real-Time Site Specific Weather Information"), reports weather forecasts through the use of storm profiles that are transmitted to remote units at dispersed geographic sites. The remote units are stationary, and storm profiles are transmitted to remote units based on their geographic location. The system has no application for use with moving vehicles, as it cannot receive information concerning the mobile location of such vehicles.

In addition to the above, because we live in an increasingly mobile society, individuals are more likely to get lost or disoriented in unfamiliar territory and have their safety threatened by severe weather conditions. Specifically, weather is a factor in a high percentage of transportation accidents, including commercial aviation (26.8%), general aviation (20%), boating (11.2% of accidents; 14.8% of accidents involving fatalities), automobiles (16.3%), and recreational vehicles (10%). While some of these accidents were due to operator error, others are due to the driver, pilot or operator of the vehicle traveling into an area of hazardous weather beyond his or her skill level or the capability of his or her vehicle to handle the inclement weather. Current terrestrial navigation and weather systems suffer from several deficiencies: 1) receipt of a warning depends on a user being tuned to a radio station in the affected area that actually broadcasts storm warnings (in addition, many radio stations no longer broadcast warnings outside of the immediate area in which they are located); 2) warnings, e.g., NWR tone alerts, are only broadcast once—if the user misses the warning, the user will not be notified of the impending inclement conditions; and 3) if the user is not tuned to the correct radio station at the time of the warning, the user will miss the warning.

Assuming that the user actually hears the warning, the National Weather Service issues storm warnings by county. Thus, in order for the warning to be meaningful to the user, he or she would necessarily need to be familiar with the county layout of the area. However, when traveling, few people know which county they are currently in or which county they are approaching, other than when in or around their own home county. In addition, when the National Weather Service indicates that a storm is "near Jonesburg, moving northeast at 40 mph," it assumes a user knows the location of Jonesburg, the spatial relationship between Jonesburg and the user's location (which may be changing if the user is in motion) and is able to integrate the motion of the storm with the motion of the user to know if the user is actually threatened. However, most people are not cognizant of this information.

Previously, the meteorological science and the positioning and communications technology required to get site specific information for a given vehicle or user and the hazards it could face did not exist. However, a number of navigation products for aviation, marine and terrestrial use have recently been introduced, including TeleType World Navigator, MapTech Pocket Navigator, MapTech Outdoor Navigator, TeleType GPS Companion, Microsoft Streets & Trips, Hertz NeverLost, ControlVision AnywhereMap/AnywhereWx.

In each of these products (except AnywhereWx), the user map orientation is fixed with a moving icon representing the vehicle (automobile or boat) in motion. This approach has a number of shortcomings, including ease with which a user can still get lost, and inability to adapt to non-fixed range conditions. That is, users who cannot easily read and interpret maps may still get lost. For example, if a map is always oriented with north at the top and a right turn is indicated, to someone traveling south the turn is actually to the left (on the map). A display that rotates to keep the route of travel at the top of the display would allow turns and other maneuvers to be synchronized with the route of travel (i.e., left on the display is the direction the driver actually turns).

Fixed ranges may be appropriate when a map display is used for navigation only, but fixed ranges are not appropriate when a device is used to anticipate hazardous conditions. For example, exits on the Kansas Turnpike can be as much as 30 miles apart. A user traveling westbound at Topeka using a navigation device with a fixed-range map display set on a range of ten miles may go past the last exit and drive into a dangerous weather situation 15 miles to the west. There would be no way for the user to avoid or escape on this limited-access rural highway.

Some known aviation systems rotate a display map with the route of flight and changes in aircraft direction. However, these are relatively large units intended to be fixed inside the cockpit of an aircraft. There is one known aviation display system that is portable, AnywhereMap by Control Vision. AnywhereMap uses a GPS signal to rotate its display to conform to the direction of travel of the AnywhereMap device. The map moves underneath a fixed icon or point on the display to indicate the location of the device above the map. There is a supplement to AnywhereMap called AnywhereWx in which current radar and other weather information is added. No forecast information is available on AnywhereWx, nor does it have the capability of changing ranges or otherwise notifying a pilot or user of hazardous conditions in the travel path. There is no technology to predict when the path of hazardous weather and a moving user will intersect.

Hertz's Neverlost in-car navigation system also changes orientation as the automobile changes direction. However, there is no weather information on the Neverlost system. In addition, because the Neverlost system is designed to assist automobile renters who are generally unfamiliar with the locale in which they have rented the car, the close-up fixed map range is inappropriate for meteorological display and warning purposes.

The aforementioned problems indicate there is a need for the solutions provided by the present invention.

BRIEF SUMMARY OF THE INVENTION

The invention provides a system and method for receiving weather forecast information in a vehicle and using that information to warn a vehicle operator of a future weather hazard with reference to the vehicle's intended direction of travel. In one embodiment, a weather forecasting center maintains a database and display of weather hazards (current and predicted) across a large area, such as the entire United States and adjacent coastal waters. The forecasting center also receives information regarding the location of each of a plurality of vehicles, such as automobiles or a fleet of commercial trucks.

A hazard location algorithm compares a forecast location of each vehicle with a forecast weather hazard and transmits a warning to each vehicle that is predicted to encounter the hazard. The warning can take the form of text, audio, and/or a visual display indicating, for example, that the vehicle will likely encounter heavy snow in approximately 30 minutes, and that the heavy snow will last for approximately 45 minutes. As the vehicle moves, its actual position is updated in the forecasting center, and a revised warning is transmitted to the vehicle. The warning can be conveyed to the vehicle in terms of mile posts, railroad stations, waypoints, Very High Frequency Omnidirectional Range Stations (VORs), etc.

In one variation, the location of the vehicle can be extracted from a data stream (e.g., an aircraft situation display data stream obtained from the FAA), instead of being transmitted from each vehicle. Vehicle operators can file a trip plan with the forecasting center, such that the predicted future location can be compared to an actual location. Information relating to pavement temperatures and other local measurements can be provided to the prediction center and used to help generate warnings to vehicle operators. Other features and advantages of the invention will become apparent by reading the following detailed description, figures, and claims.

In some embodiments, the weather forecast warning system may use a rotating map to display information to a user of the system. The system display displays a geographic map including an icon indicating a present location of the system on the geographic map, based on received location information. The display also includes forecast hazard information. Control logic of the system rotates the geographic map displayed, based on the received location information, so that a direction of travel of the system maintains constant with respect to a predetermined position on a housing of the display (e.g., the top of the display).

In some embodiments, the icon depicting the location of the system remains constant on the display. Whereas in others the icon moves on the display. The control logic can automatically adjust a range, or zoom level, of the geographic map so that the range is large enough that the geographic map includes both the icon and the forecast hazard information, when the forecast hazard information would otherwise not appear on the geographic map.

BRIEF DESCRIPTION OF THE DRAWINGS

FIG. 3A shows a current weather grid including current and forecast weather hazards, and current and forecast vehicle locations.

FIG. 3B shows the weather grid of FIG. 3A after ten minutes have elapsed.

FIG. 3C shows the weather grid of FIG. 3A after twenty minutes have elapsed.

FIG. 3D shows the weather grid of FIG. 3A after thirty minutes have elapsed.

FIG. 3E shows the weather grid of FIG. 3A after forty minutes have elapsed.

FIG. 3F shows the weather grid of FIG. 3A after fifty minutes have elapsed.

FIG. 4A shows a current weather grid including current and forecast weather hazards, and current and forecast vehicle locations.

FIG. 4B shows the weather grid of FIG. 4A after ten minutes have elapsed.

FIG. 4C shows the weather grid of FIG. 4A after twenty minutes have elapsed.

DETAILED DESCRIPTION OF THE INVENTION

Figure 1:
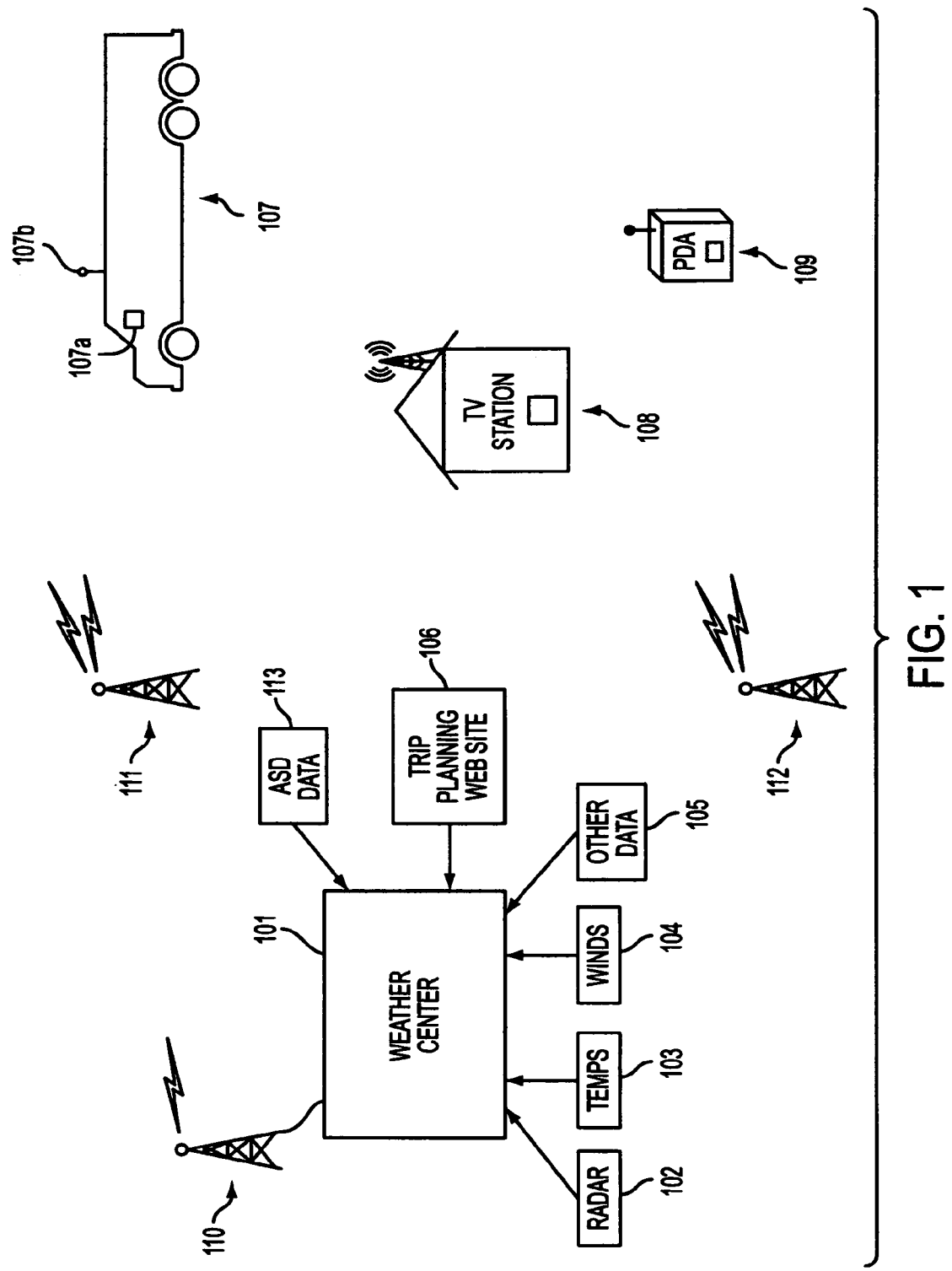
FIG. 1 shows a system including a weather center that provides weather hazard information to a plurality of recipients 107, 108 and 109.

FIG. 1 shows a system employing various principles of the present invention. As shown in FIG. 1, a weather center 101 receives weather-related information from various sources, such as one or more radar sources 102, temperature data sources 103, wind data sources 104, and other data sources 105 (including, but not limited to, regional weather stations that provide air and pavement temperature, humidity, and other measurements). One or more antennas 110 are also coupled to weather center 101 to receive information regarding the location of vehicles that have pre-registered to use the system. In addition to or instead of radio frequency communication, this information can be received over the Internet or other computer network, or via dedicated dial-up telephone lines. Additionally, Aircraft Situation Display (ASD) data 113 can be received from various sources, such as the FAA, which distributes information regarding the current location and identity of aircraft.

In one embodiment, weather center 101 is coupled to one or more trip planning web sites 106, which allow vehicle operators to pre-register with the system and to optionally file trip plans, similar in nature to so-called "flight plans" that are filed by pilots. In this embodiment, described in more detail herein, vehicle operators provide information regarding the identity of the vehicle, the intended starting point and destination, and route information (e.g., which highways will be traversed), and this information is stored in weather center 101 for tracking purposes.

Each recipient 107, 108 and 109 includes a corresponding device, illustrated by element 107a, that receives weather hazard information from weather center 101 pertaining to that vehicle's current and/or future predicted location. In certain embodiments, each vehicle is equipped with a navigational device such as a GPS receiver that enables the vehicle to determine its present position and a radio frequency transmitter that transmits the vehicle's current location to weather center 101. Additionally, as described below, each device preferably includes a display and/or audible device that permits weather hazard information to be communicated to the vehicle operator. In one embodiment, the vehicle operator receives information from a cellular telephone; a wireless Personal Digital Assistant (PDA); or other similar device.

It is presumed that a network of radio antennae illustrated as elements 110, 111, and 112 is available to relay signals to and from each vehicle. Alternatively, satellite communication can be used, or a combination of the two can be used. Various commercially available systems, such as the so-called "ON STAR™" system, can be used to transmit and receive information including vehicle identification and location information. For aircraft, the FAA provides a data stream that identifies each aircraft by its tail number and provides the current location of the aircraft. Although not critical to the invention, it is contemplated that each vehicle user (or fleet operator, where appropriate) will pre-register each vehicle with weather center 101 by providing vehicle identification information that can then be used to correlate vehicle locations with particular vehicles. Weather center 101 may charge a fee for weather hazard reporting services on a monthly or transaction basis, thus providing a commercially beneficial arrangement.

In general, weather center 101 generates weather hazard predictions for a plurality of geographic areas, such as four square kilometer "cells," and compares the location (current and predicted) of each cell in which there is a future weather hazard to vehicle locations. For each weather hazard, weather center 101 transmits a warning to each vehicle that is predicted to intersect with the cell, and optionally provides information concerning the nature of the hazard (e.g., severe snowstorm), the predicted time before the hazard will occur, based on the vehicle's current path (including, for example, the direction and speed of the vehicle), and the predicted duration of the hazard.

Weather center 101 monitors weather conditions around various geographic areas such as counties, States, bodies of water, or the entire United States, and forecasts future weather hazards such as severe storms, hail, snow, wind, ice, tornados, or other types of hazards. There are numerous methods of predicting weather involving both computers and humans, and various companies provide weather forecasting services, as does the National Weather Service. One example of a weather predicting method is disclosed in U.S. Pat. No. 5,959,567, entitled "Method and Apparatus for Tracking of Organized Storms."

Figure 2:
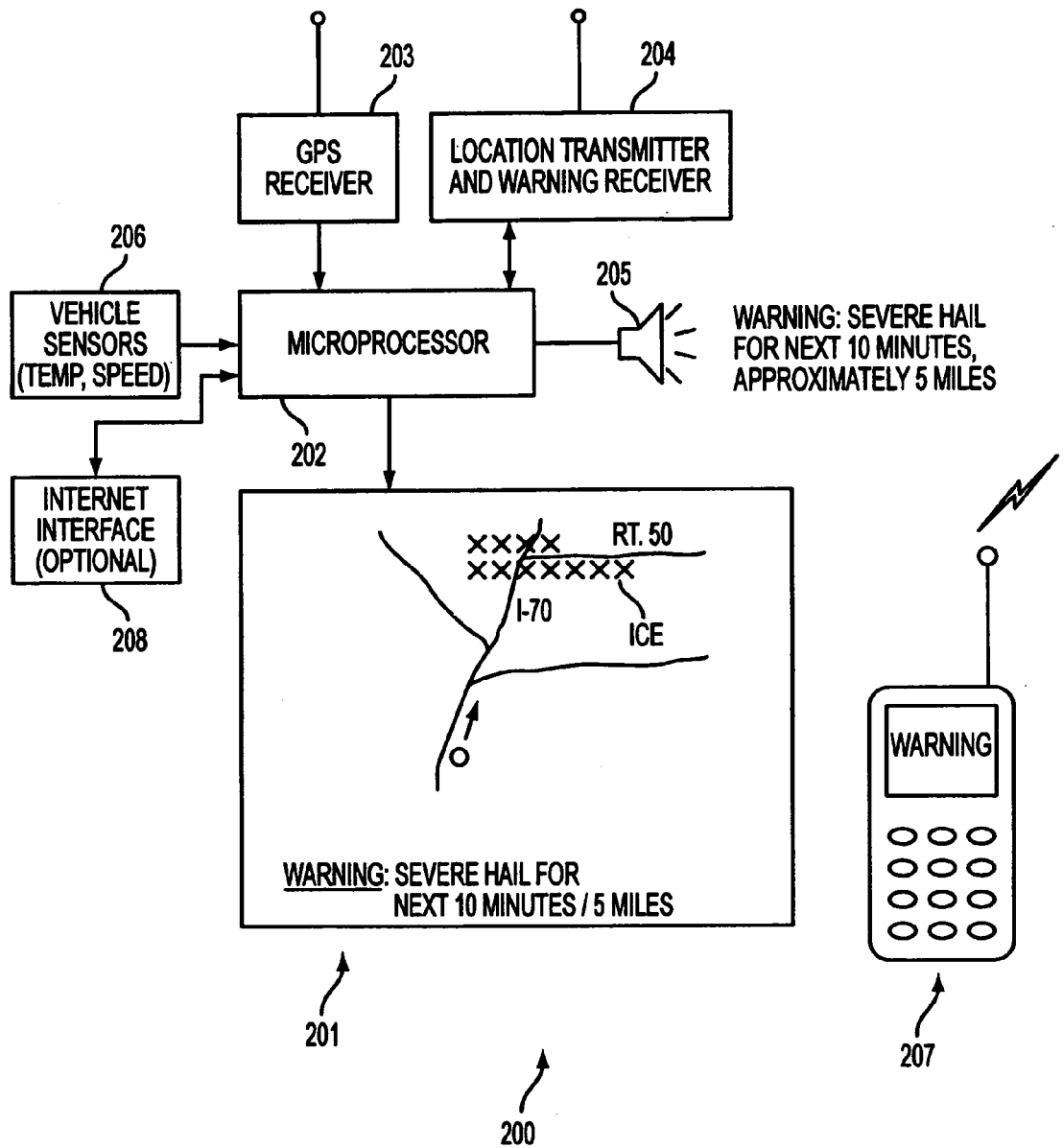
FIG. 2 shows one possible configuration for a vehicle warning system and method including a display 201 that shows weather hazard information and a cell phone 207 that optionally displays weather hazard information.

FIG. 2 shows one possible embodiment for a device 200 that can be installed in vehicles in accordance with the principles of the present invention. It will be appreciated that various types of vehicle navigational aids are commercially available, including GPS receivers and map displays that identify a vehicle operator's current location. The inventive principles can be applied by modifying any of these commercially available units to incorporate additional functions contained herein. Moreover, various commercially available systems can be installed in a vehicle to transmit the current location of the vehicle for various purposes, such as theft prevention and vehicle recovery. Alternatively, device 200 may be a standalone data processing unit with the requisite capabilities, such as a laptop or notebook computer, personal digital assistant or mobile telephone, handheld or tablet PC, or the like.

As shown in FIG. 2, a GPS receiver 203 receives information from satellites that permits the vehicle to determine its current location with a reasonable degree of accuracy.

This information is fed into a microprocessor 202, which is programmed to periodically transmit the information through a location transmitter 204, or through an Internet interface 208 using wireless means (including, for example, a cellular telephone). Additional information from the vehicle, such as data from vehicle sensors (e.g., temperature, speed, etc.) can be transmitted to the weather center through transmitter 204 or 208.

Microprocessor 202 can be programmed with information regarding where to transmit the vehicle information (e.g., a radio frequency, Internet Protocol address, or the like). Instead of a single weather center, multiple weather centers can of course be provided, and each vehicle can transmit to the nearest weather center based on its location. Alternatively, distributed receiving centers can forward vehicle location information to a central weather center using a computer network such as the Internet. Location transmitter 204 in certain embodiments includes a receiver that receives warnings transmitted from the weather center. Alternatively, the warnings can be received through Internet interface 208, or can even be received at a cellular telephone 207 associated with the vehicle operator. In the latter embodiment, warnings can be transmitted as text and/or audio messages to a cellular telephone number provided by the vehicle operator.

In one embodiment, a vehicle map display 201 of the type commonly used in commercially available vehicle navigation systems is coupled to the microprocessor 202. As shown, the map shows the current location of the vehicle superimposed on a map, such as a street or county map. Additionally, warning information received from the weather center can be superimposed in the form of text and/or graphics on the map display in order to indicate the proximity and direction of the weather hazard to the vehicle operator. A speaker 205 can be used to generate audio warnings.

Turning to the operation of the weather center, in one embodiment a computerized database of current and forecast weather information is generated and periodically updated. This data can be stored in a grid-type data structure in which a geographic area is divided into cells of a given size (e.g., four nautical miles on each side). In other words, weather hazard information extracted from a weather map (extracted either by human means or by computer) is converted into a discrete hazard indicator (e.g., severe snow, severe thunderstorm, hail, etc.) and the indicator is stored into a cell corresponding to the area over which the hazard will occur. A county, for example, may be divided into a plurality of fixed-size cells, and a storm moving through the county may cause hazard indicators to be stored in a subset of those cells as the storm moves.

For purposes of illustration, it will be assumed that a geographic region is divided into a plurality of cells. In each cell for which a current or forecast hazard exists, a hazard indicator is stored to indicate the current or predicted weather condition in the cell. The grid is updated as the weather situation changes. Thus, every few minutes, the grid is updated to reflect the latest current and predicted future weather information.

In one embodiment, information concerning each vehicle location is also maintained in the weather grid, such that overlaps between forecast weather hazards and forecast vehicle locations can be identified by computer. Assume that a severe thunderstorm is moving directly from west to east, and a vehicle is driving directly toward the advancing storm (i.e., from east to west). FIG. 3A shows a current weather grid including a plurality of cells in which a current weather hazard $W_0$ exists in five cells on the left side of the grid. A forecast weather hazard $W_{10}$ (i.e., predicted to hit in 10 minutes) exists in the next set of cells just to the east of the current weather hazard. Similarly, a forecast weather hazard $W_{20}$ exists just to the east of the 10-minute forecast, and a forecast weather hazard $W_{30}$ exists just to the east of the 20-minute prediction. Thus, assuming that each cell measures 4 nautical miles on each side, FIG. 3A shows that the storm is generally moving east at a rate of 4 nautical miles every 10 minutes. Although only one weather hazard per cell is shown, it is of course possible to have multiple weather hazards activated in each cell (e.g., severe hail and severe lightning, for example). It will be appreciated that different cell sizes and granularity can be used as desired; in general, smaller cell sizes will result in increased computational needs.

Also shown in FIG. 3A is a forecast vehicle location, illustrated by the notation $V_0$ (vehicle position now) through $V_{30}$ (forecast vehicle location 30 minutes from the present time). As shown in FIG. 3A, the vehicle is moving due west at approximately 4 nautical miles every 10 minutes. At the initial time as shown in FIG. 3A, the current vehicle position is not in a cell for which a weather hazard exists, and there is no projected overlap for the next 30 minutes based on the 30-minute forecast weather hazard (indicated by $W_{30}$) and the 30-minute forecast vehicle position (indicated by $V_{30}$).

FIG. 3B shows the weather grid of FIG. 3A after ten minutes has elapsed. In FIG. 3B, all of the current and forecast weather hazards have moved one cell to the right (i.e., moved due east by four nautical miles), and the vehicle positions (current and forecast) have moved to the left by one cell (i.e., moved due west by four nautical miles). Consequently, there is now an overlap between the vehicle's 20-minute forecast location and the storm's forecast 30-minute future location. According to one variation of the invention, the weather center generates a warning to the vehicle indicating that a weather hazard is forecast to hit the vehicle in 30 minutes and, optionally, when the vehicle will "clear" the hazard. In general, the system looks for matches to indicate the time that the hazard will first be encountered and its duration (i.e., based on the number of cells that the vehicle is expected to travel through). There may be times when the hazard is so large that the end of the hazard will be beyond the 30-minute interval; in such cases, no "duration" need be provided.

There are many different ways of evaluating the overlap situations illustrated in FIGS. 3A through 3F, and the following is intended to provide one example only. In one variation, for each overlapping cell, if the vehicle forecast time is greater than the weather forecast time (e.g., $V_{30}$ is greater than $W_{20}$), the cell is ignored for warning purposes, whereas if the weather forecast time is greater than or equal to the vehicle forecast time, a warning is generated. Thus, according to one variation of the method, a warning is generated for only one cell in FIG. 3B (i.e., the cell containing $W_{30}$ and $V_{20}$). The warning time is the weather forecast time for that cell (i.e., 30 minutes). The validity of this prediction can be seen by looking forward to FIG. 3E, which shows the situation 30 minutes later (i.e., the current vehicle position $V_0$ coincides with a current weather hazard, $W_0$).

Turning now to FIG. 3C (twenty minutes later), there are four cells in which the vehicle's location falls in cells containing weather hazards. However, the two leftmost cells contain overlaps where the vehicle forecast time is greater than the weather forecast time, and these can be ignored. The remaining two cells indicate that the vehicle's current location is in a 30-minute hazard cell (cell containing $V_0$), and that the vehicle's 10-minute future location is in a 20-minute hazard cell (cell with $V_{10}$). The hazard time can be calculated as $T=V+(W-V)=W$, or 20 minutes. That is, the hazard time is the weather forecast time in the leftmost cell that does not contain a vehicle forecast time that exceeds a weather forecast time. The validity of this forecast can be seen by looking forward to FIG. 3E (twenty minutes hence), which shows that the vehicle is in a cell experiencing a weather hazard.

Alternatively, where multiple overlapping cells occur, a subtraction value W–V can be obtained (i.e., subtract the vehicle forecast time from the weather forecast time) for each cell. The cell containing the lowest non-negative number is used to generate the warning value, and the warning value is the weather forecast time. For example, in FIG. 3B, there are two overlapping cells, the first one having a W–V value of –10, and the second having a W–V value of +10. The cell containing the +10 value is used, and its weather forecast time is 30 minutes. Therefore, a 30-minute hazard warning is generated. Similarly, in FIG. 3C, there are four overlapping cells, as follows: first cell W–V=–30; second cell W–V=–10; third cell W–V=+10; fourth cell W–V=+30. The cell generating the lowest non-negative number has a weather forecast value of 20 minutes, which can be verified by looking ahead 20 minutes (FIG. 3E). Similarly, in FIG. 3D, there are three overlapping cells, as follows: first cell W–V=–20; second cell W–V=–10; third cell W–V=+10. The weather forecast value of that cell is 10 minutes, which can be verified by looking ahead 10 minutes (to FIG. 3E). Finally, in FIG. 3E there is only one overlapping cell, which has a W–V value of zero. The weather forecast value for that cell is zero, indicating that a weather hazard presently exists for the vehicle.

FIGS. 4A to 4C show a different scenario in which the vehicle's predicted path changes over time (i.e., from generally northwest to generally southwest). Beginning in FIG. 4A, at an initial time there is an overlap between two cells. The first cell has a W–V value of –20, and the second cell has a W–V value of zero. The weather forecast for the non-zero cell is 20 minutes, indicating that a weather hazard will occur in 20 minutes.

In FIG. 4B, ten minutes later, there are four overlapping cells, with W–V values as follows: first cell, W–V=–30; second cell, W–V=–10; third cell, W–V=+10; fourth cell, W–V=0. The two non-negative cells show weather hazard forecast times of 20 minutes and 10 minutes, respectively. The lowest non-negative cell has a forecast time of 10 minutes, which can be given as the warning.

In FIG. 4C (twenty minutes after FIG. 4A), the forecast vehicle position has now shifted to a southwest position, possibly as a result of receiving updated position information from the vehicle, or due to an interpolated new path based on updated information, or due to other information such as deviation from a previously provided travel plan. In FIG. 4C, there are two overlapping cells, with W–V values as follows: first cell, W–V=0; second cell, W–V=+10. Using the cell having the lowest value (0), the forecast weather hazard time is 10 minutes, which can be given as the warning.

In addition to providing a warning indicating the time that a weather hazard will be encountered, the system can provide an estimate as to the duration of the hazard, based on the current travel path of the vehicle. For example, if the weather grid indicates that the forecast vehicle position for the next 30 minutes will intersect cells in which storm activity is predicted for the next 30 minutes, but thereafter will be cleared of the storm cells, the system can inform the vehicle operator that the weather hazard will last for 30 minutes. In FIG. 3C, for example, a hazard duration value of 20 minutes can be given, because the vehicle's 20-minute future position is not in a cell that contains a weather hazard.

As explained above, weather center 101 preferably maintains information regarding the positional location (e.g., latitude and longitude) of each of a plurality of vehicles that have pre-registered with the weather center to provide mobile weather hazard reporting services. In one variation of the invention, each vehicle periodically transmits its current location to the weather center, and this information is used to update the weather grid. Vehicles can pre-register with weather center by providing identification information (e.g., the VIN for an automobile, a license plate number, fleet serial number, or the like), and this information is transmitted along with the positional information to weather center 101. Additionally, the computer in weather center 101 can extrapolate future (forecast) positions for the vehicle by comparing two previous locations along with the time differences between transmissions from those locations.

For example, if a vehicle has moved between two latitude/longitude points within a certain period of time, the computer can calculate a predicted heading and velocity based on these two points and the elapsed time between the points. This heading and velocity can be translated into cells using simple linear algebra.

Vehicle locations can also be correlated and interpolated based on a "flight plan" provided by a vehicle owner before leaving for a trip. A web site can be used to facilitate the entry and transmission of this information to weather center 101. For example, a driver can indicate on a map the starting point, ending point, and intended travel path (e.g., by highlighting this route on a graphical map). Weather center 101 can use this information to determine the likely position of a vehicle based on the starting time of the trip and the elapsed time. Additionally, information regarding speed limits on various highways can be taken into consideration when determining the likely position of a vehicle (e.g., if traveling on an interstate that has a 65-mph speed limit, the computer can assume that the vehicle has maintained this speed between two points). Consequently, if weather center 101 does not or cannot receive a signal indicating vehicle position, it can estimate the position based on the trip plan filed by the vehicle operator. In the event that weather hazards are predicted for the vehicle, the system can suggest an alternate route that avoids or minimizes intersections with cells that have weather hazards.

In another variation of the invention, vehicles can register to use the service by using a telephone (e.g., a cell phone) to dial a telephone number and provide the cell phone number, to be activated for weather alerts. For example, a family traveling by automobile can use a cell phone to call a toll-free telephone number and enter the telephone number of the cell phone. Thereafter, they can periodically transmit their current location (either automatically through an apparatus of the type shown in FIG. 2) or through the cell phone itself. Weather center 101 can thereafter transmit weather hazard warnings directly to the cell phone, in the form of short text messages, or by voice messages.

Aircraft positions can be obtained from an Aircraft Situation Display (ASD) data source, such as that provided by the Federal Aviation Administration. In this variation of the invention, weather center 101 obtains periodic location information and identification information (e.g., tail numbers) and uses it to identify the location of airplanes. Consequently, it is not necessary for aircraft to transmit their location to weather center 101, although such a configuration is of course within the scope of the invention.

In addition to transmitting current location information, each vehicle may transmit other data, such as temperature and current and average velocity. Temperature data from the vehicle could be used, for example, to help predict whether the roads will be icy based on meteorological conditions.

Figure 5:
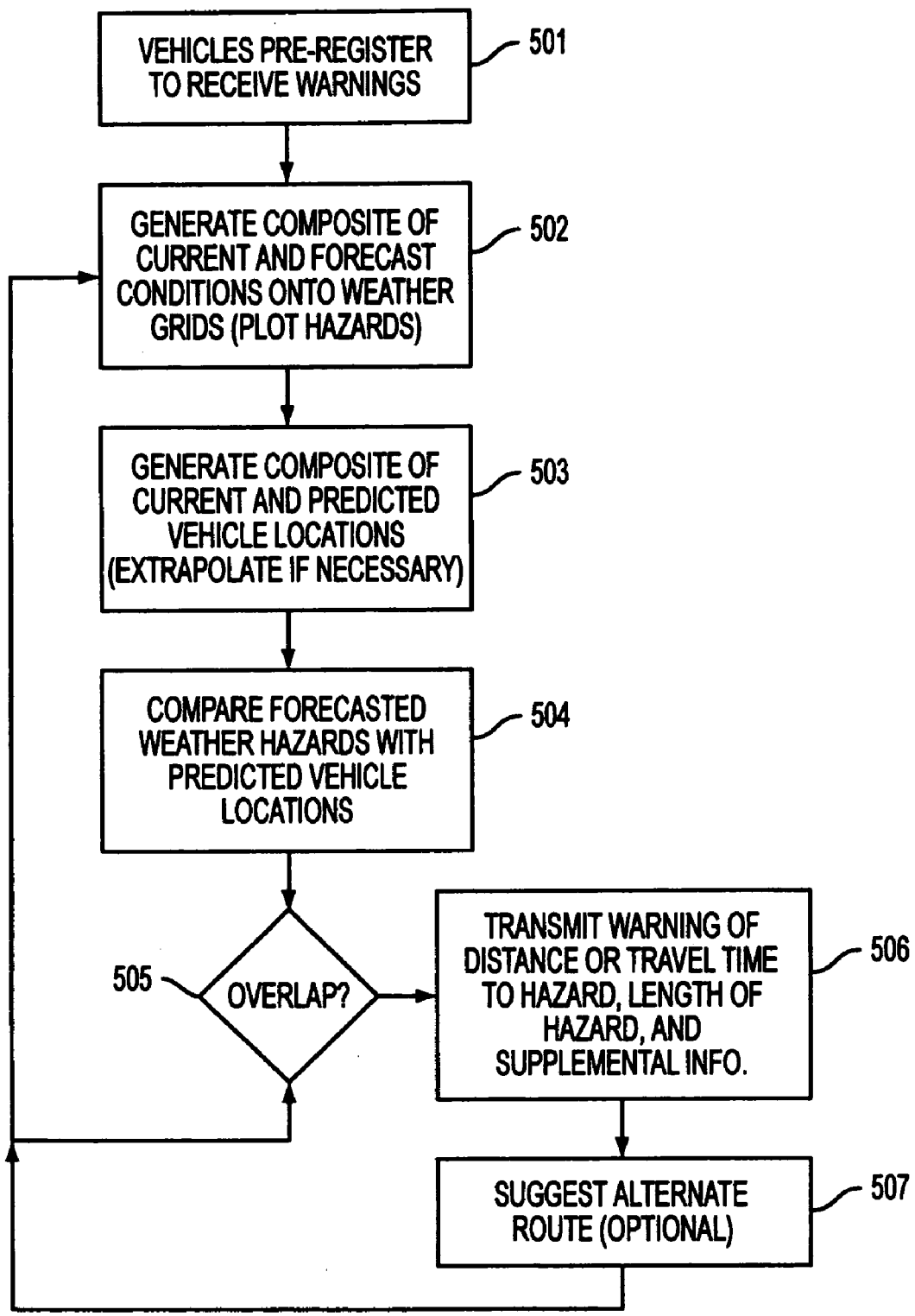
FIG. 5 shows a method of generating weather hazard information for vehicles according to various principles of the present invention.

FIG. 5 shows various steps of a method that can be used to carry out various principles of the present invention. Beginning in step 501, one or more vehicles pre-register to receive warnings. As described above, this pre-registration can occur by using a web site; a telephone; or by other means. The registration step associates a vehicle identifier with the vehicle, so that subsequent location updates for that vehicle identifier can be correlated with the vehicle, including means for communicating with the vehicle (e.g., an Internet Protocol address of a device in the car; a cell phone telephone number to which warnings will be transmitted, the network address of a wireless PDA; or the like). Once registered and activated, weather center 101 will track and provide warnings to the vehicle.

In step 502, a composite of current and forecast conditions is generated and mapped onto a weather grid such as the type shown in FIG. 3A. There are many different methods of predicting weather hazards, including human-originated means, computer-generated means, and combinations of the two. As is conventional, various meteorological displays can be generated to show various forms of precipitation, temperatures, pressures, and wind conditions. The data can include radar reflectivity data such as that generated by NEXRAD radars operated by the National Weather Service; "slime track" information showing the position of observed or actual tornados over a period of time; meteorologist-entered information such as the suspected location of a tornado or other severe weather event; information derived from spotters; and other data tending to show a severe weather event such as a tornado. In one embodiment, this information can also include predicted future storm or tornado tracks that are predicted using any of various technologies, such as those illustrated in U.S. Pat. No. 5,959,567, entitled "Method and Apparatus for Tracking of Organized Storms."

The future path of a storm or other severe weather event can be predicted in various ways. As noted above, a future storm path can be predicted using an algorithm of the type described in the '567 patent. In another embodiment, a future path can be predicted using human judgment (e.g., trained meteorologists monitoring various radar data and other sensed information). In yet another embodiment, a projected path as provided by the National Weather Service (NWS) can be used. The NWS often provides an array of points or "dots" that can be connected to determine the path along which a tornado or hurricane is expected to move.

A tornado location can be heuristically determined using a combination of radar echo shape ("hook" echo), radar wind velocity and echo structure, all well known in the meteorological community. Once the initial position is determined, a predicted future location can be predicted using the principles set forth in the '567 patent, or a meteorologist can use his or her judgment to establish a projected future path. The National Weather Service transmits a Tornado Detection Algorithm (TDA) in its WSR-88 radar data stream, and this TDA position could thus also be used. The NWS also uses its own movement algorithms, which could be employed in conjunction with the principles of the invention. Finally, information supplied by "spotters" can be used in conjunction with any of the above techniques in order to pinpoint the location of an actual tornado.

In step 503, a composite of current and forecast vehicle locations is generated and stored in a data structure like that of FIG. 3A, such that vehicle positions and weather hazards can be evaluated to determine whether there are intersections in cells that would warrant one or more warnings. As explained above, vehicle locations can be extrapolated if necessary, and updated as vehicle location updates are received.

In step 504, the forecast weather hazards and the forecast vehicle locations are compared to determine whether there are any overlaps. As explained above, for example, if a forecast vehicle position in 30 minutes will intersect with a cell in which a storm hazard is forecast for 30 minutes, a warning will be sent to the vehicle operator, based on the pre-registered information (e.g., information correlating the vehicle identifier to a cell phone number, IP address, or other communication tool). Additionally, the duration of the weather hazard can be provided based on the forecast path of the vehicle and the end of the weather hazard. For example, if a severe hailstorm is predicted to occur across a large number of cells, but the vehicle will have passed beyond the cells in 45 minutes, then the weather center can indicate that the hazard will subside in 45 minutes.

Consequently, in step 505 a warning of the distance or travel time to a hazard is transmitted to the vehicle or vehicles in the cell corresponding to the hazard, along with the duration of the hazard and other supplemental information as available (e.g., tornado spotted in the cell in which the vehicle is traveling). In step 506, an optional step of suggesting an alternate route can be provided.

In an alternative embodiment of the invention, the functions of the weather center may be performed by system 200 (FIG. 2) based on received location and hazard information, such as meteorological or weather information. That is, each system 200 may include control logic (e.g., computer software executed by microporocessor 202) to perform the functions of a weather center with respect to itself, calculating warning information for itself based on the received location and hazard information. In such an embodiment, an information distributor may relay pertinent weather and hazard information to each system, or the information may be received directly from primary information sources (e.g., the National Weather Service). In addition, a "vehicle" may be any mobile computing device with built-in communications capabilities.

Rotating User Map

According to an aspect of the invention, a rotating user map may be used to improve vehicle navigation and hazard awareness, resulting in improved safety and productivity. While the invention is described with respect to weather hazards and meteorological information, the invention is applicable for providing warnings for any type of hazard, including natural or man-made disasters, etc.

The GPS receiver 203 may communicate with the microprocessor 202 to generate for display on display 201 a map that is tied to latitude and longitude coordinates and that "rotates" as the user changes directions. That is, the top of the display (or any arbitrary fixed point) faces the same direction the user is traveling. In addition, the range of the display (i.e., the level of granularity and size of the area visible on the display) is selectable by a user of the device or dynamically by software controlling the device's operation. The range refers to the zoom level of the display. For example, a customer may use a short range (high zoom level) when using the system primarily as a navigational tool, e.g., where the display depicts an area of only 1 square mile, in order to view in detail the immediately surrounding area. However, a customer may use a larger range (low zoom level) when using the system to receive meteorological information and/or warnings, e.g., the display depicts an area of 100 square miles, in order to clearly view meteorological information for a larger geographic area. The zooming of the display may be controlled by the microprocessor 202.

Figure 6:
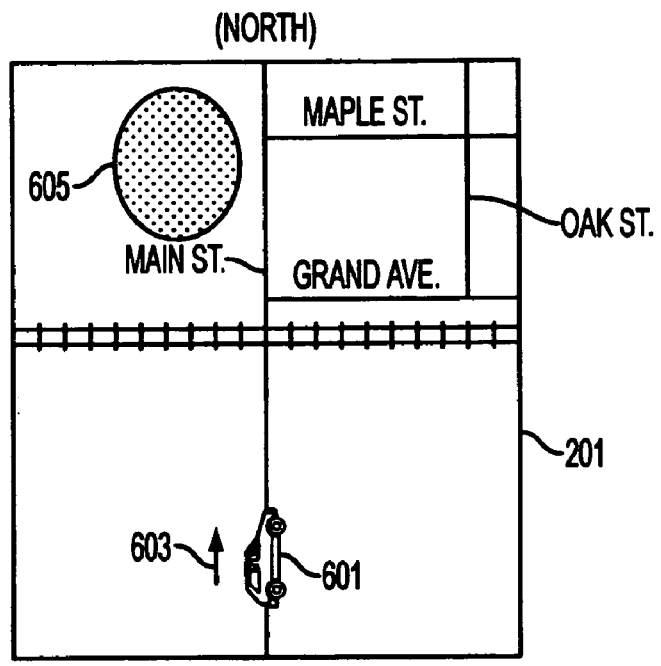
FIG. 6 shows an illustrative rotating user map in a first orientation according to an aspect of the invention.
Figure 7:
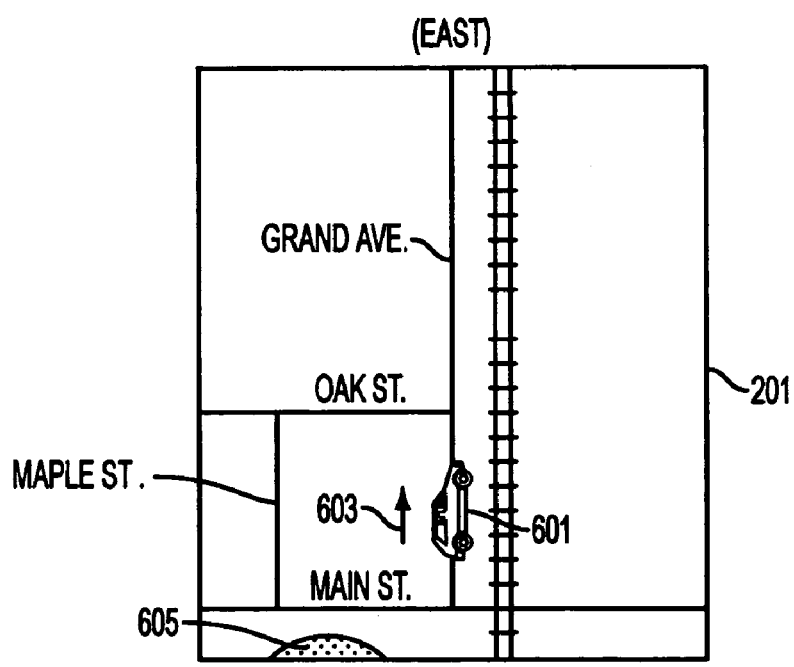
FIG. 7 shows an illustrative rotating user map in a second orientation according to an aspect of the invention.

FIG. 6 illustrates a display 201 of device 200, where the system is traveling to the north, and rain 605 is illustrated with respect to the location of the system. If the user holding the system or vehicle in which the system is located turns right onto Grand Ave. and begins traveling to the east, the display rotates so that the direction of travel is at the top of the display (or any other predetermined side), such as is illustrated in FIG. 7. While an icon 601 depicting a car is used to indicate the system's current position, any icon may alternatively be used. Arrow 603 is for illustrative purposes, indicating the direction of travel of the system, and does not necessarily need to be included on display 201.

Figure 8:
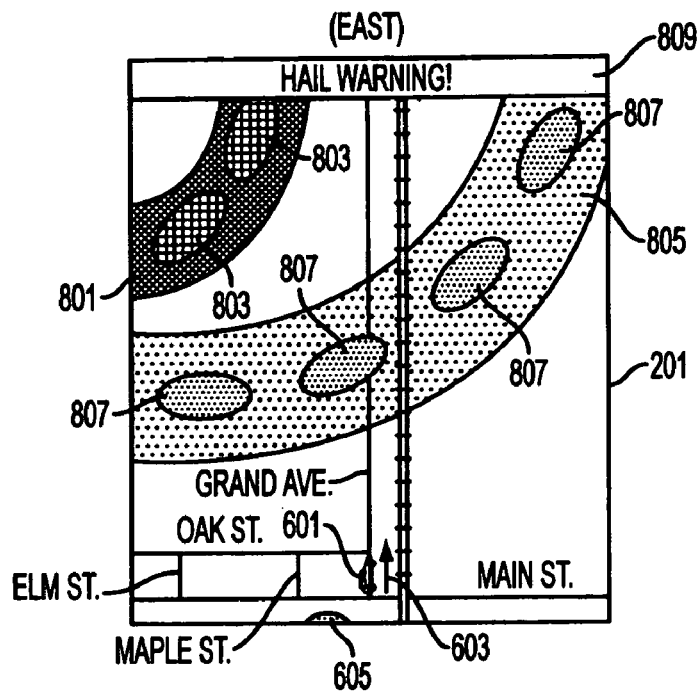
FIG. 8 shows an illustrative rotating user map in the second orientation according to an aspect of the invention, zoomed out from FIG. 7.

With further reference to FIG. 8, an aspect of the invention provides current and forecast weather information pertinent to the system's route of travel. An override system may cause the zoom level of the display to change to insure that the user receives critical information regardless of the range or direction of travel when the information becomes pertinent. The method as performed by the system may be controlled by the microprocessor connected to the GPS receiver with appropriate circuitry, hardware and/or software control logic.

When a user is viewing the display at a high zoom level (e.g., one mile) to view detailed street, topographic or marine information, meteorological information regarding an approaching storm might not be visible on the display 201 until the system (and its user) is too near the meteorological phenomenon (e.g., inclement weather such as heavy rain or a lightning storm) to take appropriate precautions such as altering his or her route of travel to avoid the inclement weather. Thus, according to an aspect of the invention, the system automatically enlarges the range (lowers the zoom level) as appropriate such that the meteorological threat is visible on the display as well as the icon 601 indicating the position of the system.

FIG. 8 illustrates the display after the system automatically zooms out from the display illustrated in FIG. 7. FIG. 8 illustrates the icon 601 indicating the current location of the user, the present location 801 of a storm with severe weather areas 803 (e.g., hail), and the forecast location 805 of the storm and severe weather areas 807, with which the system will intersect. FIG. 8 also illustrates a warning 809 indicating that hail is predicted. The warning may optionally include a duration or expiration time (see FIG. 9, discussed below). The types of hazards or inclement weather for which the system will automatically adjust the range of the display 201 may be user-defined or set by the system software.

In some embodiments the system automatically changes the zoom level without user input if the inclement weather will intersect an extrapolated path of the user or the path as depicted on a pre-registered trip plan. The extrapolated path of the user may be based on a direction of travel of the system, or may be based on the road on which the user is currently traveling. That is, if the road turns or changes directions, the system may assume that the system will turn and change directions with it. Alternatively, the user may specify or the system may provide a default safe distance, e.g., five miles, where if the inclement weather is or is forecast to be closer than the safe distance value, then the system will automatically adjust the zoom such that the inclement weather (or weather forecast) is visible on the display.

However, if the system and the inclement weather are not calculated to intersect (or get closer than the safe distance) at some future time, the system might not automatically change zoom levels. For example, when the system is traveling away from the inclement weather and the paths of the system and the weather do not intersect, the system will not change the zoom level and interrupt the user's viewing of the display (e.g., the user is heading south at 65 mph and the inclement weather behind the user, while also heading south, is only moving at 30 mph).

Figure 9:
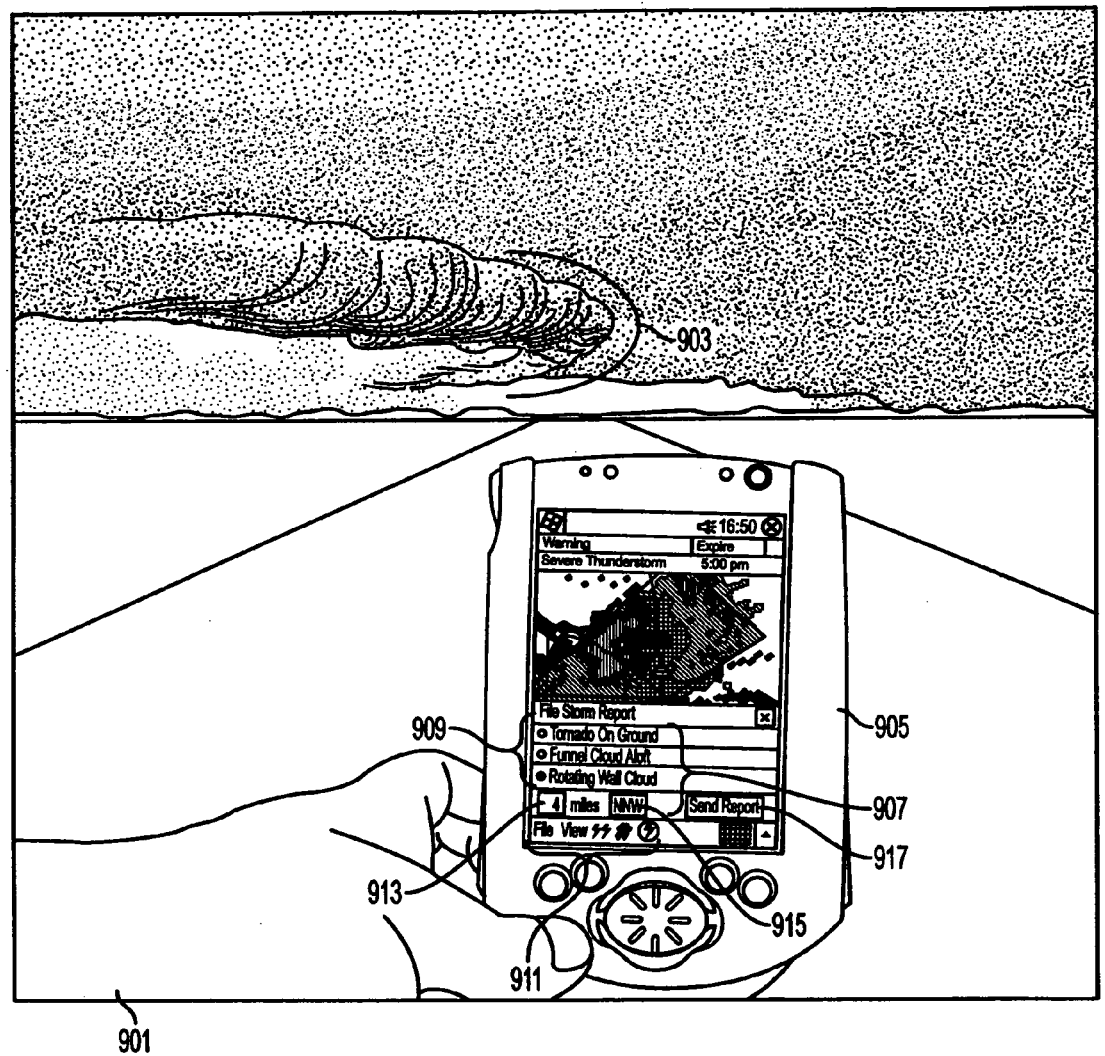
FIG. 9 illustrates a storm spotter observing meteorological conditions using a mobile device, according to an illustrative embodiment of the invention.

Using the above described systems and methods, the weather warning system is user centric in that the display is based on the system's specific location. Another system one mile away will provide a different display. Each system displays hazards or hazard warnings when the hazard is pertinent to the specific system's location or path. Each system overrides the user to display a hazard pertinent to the system's location if the hazard is within a distance selected by the user, and each system will not interrupt a user when the system is not threatened by the hazard. By only displaying information pertinent to the specific system, the effectiveness of a storm warning or other alert is maximized because false alarms are minimized. Another mobile device 905 displaying hazard information on a rotating user map is illustrated in FIG. 9, discussed further below.

Automatic Spotter Information

As indicated above, meteorological condition information or hazard information may be observed by a spotter near a location of the observed condition. FIG. 9 illustrates a spotter 901 observing meteorological condition 903, namely, a rotating wall cloud, indicative of a future tornado. Spotter 901 may enter data 907 into a mobile computing device 905, e.g., a personal digital assistant, smartphone, mobile telephone, or the like. Data 907 may include a type 909 of the observed condition, and an approximate location 911 of the observed condition. The approximate location may be based on the location of the mobile device 905, e.g., when device 905 includes a global positioning system (GPS). The spotter 901 may enter information indicating that the observed condition is at the location of the mobile device 905, or may provide information indicating the observed condition's location relative to the mobile device 905, e.g., by providing a distance 913 from the mobile device 905, and a direction 915 from the mobile device to the observed condition. The device may then convert the location information into estimate latitude and longitude coordinates. After the spotter has entered the relevant data 907, the spotter can send the data to the weather center using a submit button 917 or the like.

As one of skill in the art will appreciate, various input methods may be used to enter data 907 into mobile device 905. For example, the observed condition may be selected from predetermined inputs, e.g., by using a drop down list, radio buttons, or the like. Alternatively, the spotter 901 may manually enter the observed condition, e.g., by typing or writing input into the mobile device 905 as is known in the art. The predetermined inputs may be selected by the mobile device based on a category (e.g., tornado, precipitation, lightning, etc.) selected by the spotter. Thus, if the spotter selects the tornado category, the mobile device may provide a drop down list or radio buttons having selections for "Tornado On Ground," "Funnel Cloud Aloft," and "Rotating Wall Cloud" as is illustrated in FIG. 9. In addition, the user of the mobile device may provide an approximate location of the observed condition by selecting a position on the displayed map. That is, the user can touch the screen at the approximate location of the observed condition, and the device translates the touch input coordinates to an approximate location (e.g., latitude and longitude) of the observed condition based on the input location on the displayed map.

Upon submitting the data to the weather center 101 (FIG. 1), the weather center may perform an integrity check on the reported data. The integrity check may include determining the user or spotter from which the information was received. If the spotter is known to the organization operating the weather center, the information is more likely to be reliable than if the information is received from a user unknown to the organization operating the weather center. In addition, the weather center may compare the received information to known meteorological conditions to determine if the condition is likely or even possible. For example, upon receiving a report from a spotter that a rotating wall cloud has been observed at location X,Y, the weather center may compare the report with other meteorological information. If all other meteorological information indicates that location X,Y is sunny with no clouds in the sky, the received report might be discarded or ignored.

Figure 10:
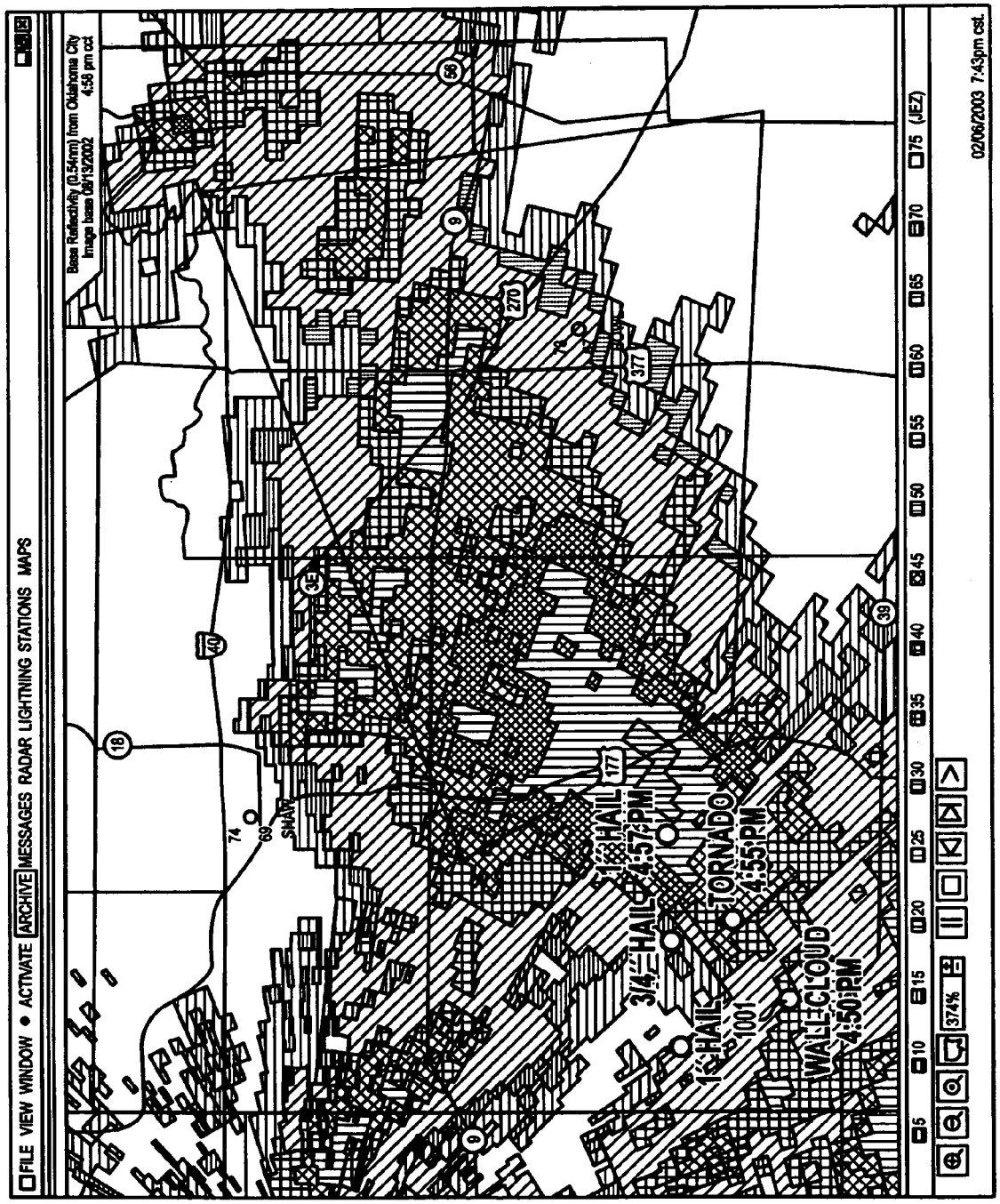
FIG. 10 illustrates a display of meteorological conditions as reported to a weather monitoring system, according to an illustrative embodiment of the invention.

After performing the integrity check, the weather center integrates the newly received meteorological information with presently known information, e.g., information received from other weather sources such as the National Weather Service. In addition, the weather center may transmit the updated information to remote subscribers who have previously requested to be kept informed of meteorological conditions in certain areas. FIG. 10 illustrates a subscriber display including an indication 1001 of the spotter's report regarding the rotating wall cloud.

Custom Warnings

According to an aspect of the invention, a subscriber may be a television station or a meteorologist employed by a television station, and updated meteorological information may be automatically sent to a computer used by the meteorologist or at the location of the television station. The meteorologist may want to display information, referred to as a "crawl", over a television program being broadcast by the television station, based on the received meteorological information. The crawl displays text moving from right to left on the top or bottom of a television screen. However, if the meteorologist is not present, viewers might not receive a crawl warning that they otherwise would if the meteorologist were present when the warning arrived from the weather center. Thus, the weather center (or alternatively the subscriber's computer with applicable control logic or software) may automatically generate crawl text for broadcast over a television program. When the meteorologist subscriber's computer receives or generates the automated crawl text, the crawl information is sent to a broadcast computer for mixing with the television signal, such that the broadcast television signal includes the crawl text moving across the screen.

Figure 11:
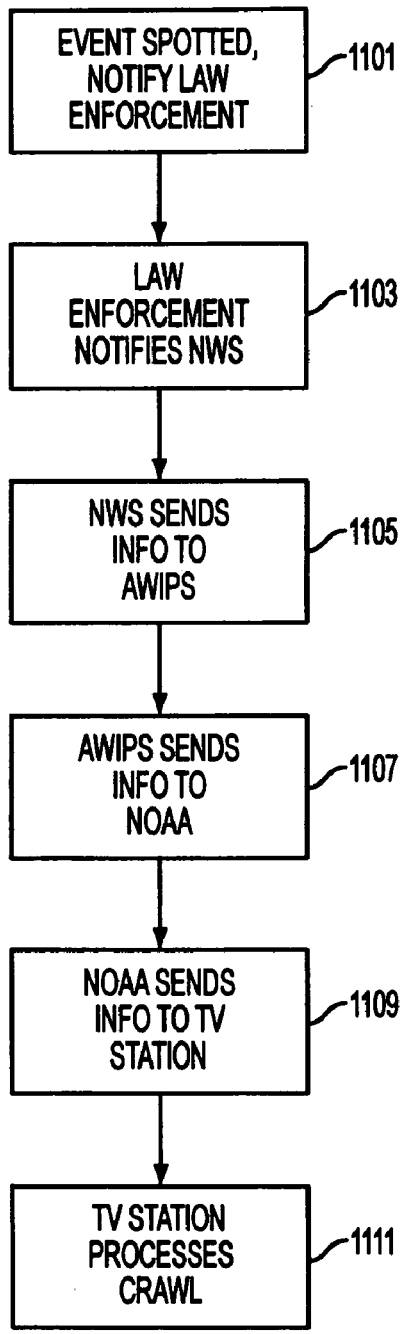
FIG. 11 illustrates a conventional crawl generation method.

FIG. 11 illustrates a conventional method for generating a crawl for display over a television broadcast. In a typical scenario, in step 1101, a tornado or some other event is spotted by a stormchaser or other individual near the location of the tornado, and the individual notifies a law enforcement agency, e.g., by calling 911 or the police. In step 1103, the law enforcement agency notifies the National Weather Service. In step 1105, the NWS manually sends the information to the Advanced Weather Interactive Processing System (AWIPS) of the NWS. In step 1107, an AWIPS administrator types in information regarding the tornado or other event and sends the information to the National Oceanic and Atmospheric Administration (NOAA) Weather Wire. In step 1109, the NOAA Weather Wire sends a notification to a television station. In step 1111, the television station processes the notification by manually entering crawl text based on the notification, and airs the crawl for broadcast. The amount of time from initial sighting in step 1101 to display in step 1111 usually takes approximately 5 to 30 minutes.

Figure 12:
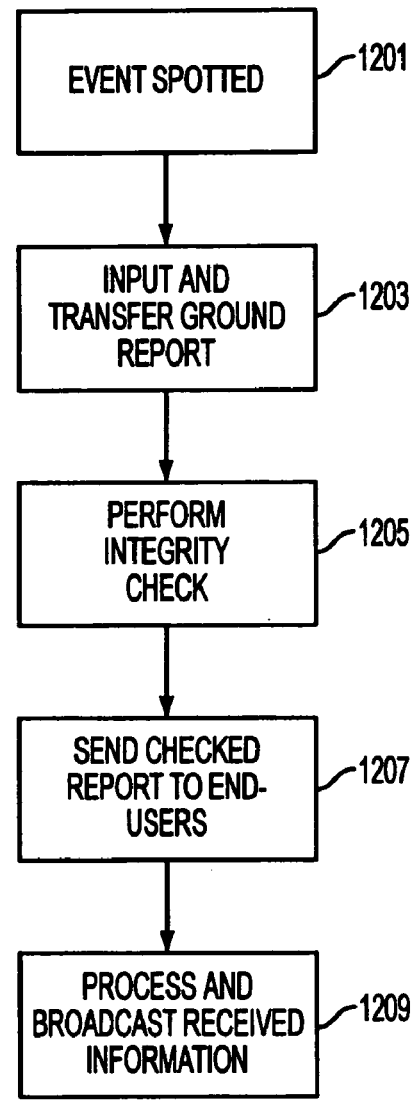
FIG. 12 illustrates a method for generating information for broadcast via television according to an illustrative embodiment of the invention.

FIG. 12 illustrates a method for generating television display information according to an illustrative aspect of the invention. In step 1201, a storm chaser or other individual equipped with a mobile device as described herein witnesses a tornado or other hazardous event. In step 1203, the user inputs information about the event into the mobile device, which wirelessly transmits the information to a weather center. In step 1205, the weather center performs a quality control integrity check on the received "ground truth" report, either by manually comparing the received report to the current weather radar for the applicable area, or by using automated computer algorithms to do so. In step 1207, the weather center sends the quality controlled report to a device, such as a remote, mobile or vehicular device described herein (including, e.g., the device from which the report was received). The weather center may also send email notifications or other reports to one or more devices or entities including, e.g., the NWS, news media, etc. The remote device may also include a computing device at a television station which, in step 1209, automatically processes the received quality controlled report for broadcast via television. The television broadcast might include not only a text crawl, but also a plotted weather report similar to that illustrated in FIG. 10. The amount of time from initial sighting in step 1201 to display in step 1209 takes less than one minute, and typically only requires about 30 seconds when the integrity check is performed automatically.

An advantage of the present invention is that crawl information can be automatically generated without human intervention, thus presenting crawls and other information to viewers in much less time than previously possible. In some embodiments, a user may be required to authorize or approve the automatically generated text, for example, a meteorologist may approve the crawl text prior to its being sent over the broadcast. In other embodiment, the crawl may be sent automatically over the broadcast without requiring a user to approve or authorize the crawl. Another advantage of the present invention is that, because the remote device from which a ground truth report is received may be GPS-enabled, location information is inherently trustworthy. Whereas in previous solutions, manual data entry errors often resulted in misidentifying the location of meteorological events.

Using the above-described system, a user is not required to type the text of the crawl into a computer because the weather center or client computer can generate the crawl automatically based on the location of the client computer, or based on some other predetermined location (e.g., the viewing area of the television station). The weather center or subscriber computer may store a database of text information indicative of common words and phrases used in warnings, e.g., times, locations, hazard types, and the like. When a warning is received that should be provided to television viewers, the weather center or subscriber computer automatically generates a crawl message using the stored words and phrases in the database, e.g., "A thunderstorm watch is in effect for Washington County until 9:30 PM.", based on the content of the hazard warning information received from the weather center. Alternatively, crawls can also be manually typed into a Chyron or other messaging system at the television station.

Figure 13:
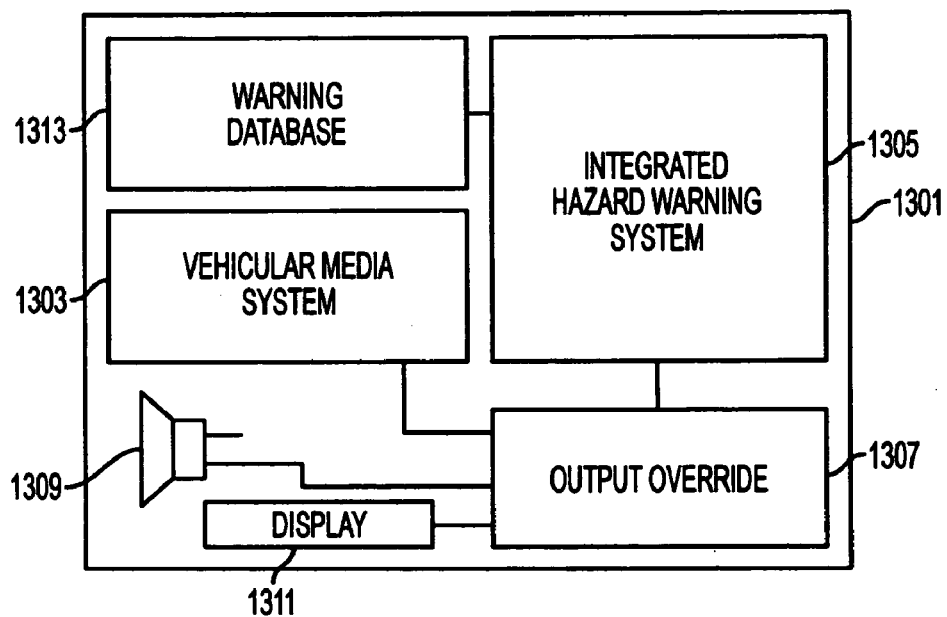
FIG. 13 illustrates a block diagram of a vehicular media system with an integrated hazard warning system, according to an illustrative embodiment of the invention.

According to another aspect of the invention, audio warnings may be automatically generated and spoken back to a user of a mobile warning device. For example, with reference to FIG. 13, a hazard warning system 1305 as described herein may be integrated in a vehicular media system 1303, e.g., AM, FM, or satellite radio receiver, CD/DVD player, digital music player, navigation system, or the like, so that the vehicle has one combined information and media display system 1301. The vehicular media system 1303 and hazard warning system 1305 may both be connected to an output override circuit 1307. The output override circuit, by default, passed information received from the vehicular media system 1303 to the audio and video output devices, e.g., speaker(s) 1309 and visual display 1311. However, when a warning is receive or detected by hazard warning system 1305, the output override circuit may mute or lower the volume of the vehicular media system 1303 and output audio information from hazard warning system 1305 via speaker 1309. In addition, output override circuit 1307 may overlay information received from hazard warning system 1105 on top of other information already displayed on visual display 1311.

Hazard warning system 1305 may be connected to warning database 1313 that stores audio clips that may be combined to provide customized audio warnings to a driver of the vehicle so that the driver does not need to divert his or her attention from the road to read information on the visual display. Warning database may store pre-recorded audio clips that hazard warning system 1305 combines and plays to provide the proper warning. E.g., hazard warning system 1305 might combine the recorded audio clips "hail," "is," "detected," "five," "miles," "ahead," "and," "is expected to last," "until," "four," and "PM" to inform the user that the system, on its present route of travel, is predicted to encounter hail in five miles and the hail will last until 4 PM. In an alternative embodiment, the warning database stores text strings which, after combined, are read back by a text-to-speech processor in the hazard warning system 1305.

Any of the methods of the invention can be implemented in control logic, e.g., software, that can be stored on computer disks or other computer-readable media for execution in a computer or other data processing device. The invention can be implemented using web browser technology, handheld computing units, and/or cellular telephones in addition to or instead of being integrated into a vehicular system. Moreover, the invention has wide application for various types of weather hazards including lightning, hail, hurricanes, wind shear, and the like, and the inventive principles can be applied equivalently to such phenomena, as well as to natural and man-made disasters. No claim should be interpreted to be in means plus function format. Numbered steps in method claims should not be interpreted to require a particular ordering of the steps, unless the claim expressly requires such ordering. What has been described above is merely illustrative of the application of the principles of the present invention. Other arrangements and methods can be implemented by those skilled in the art without departing from the spirit and scope of the present invention.

I claim:

1. A method for providing information regarding an observed event, comprising:
   (a) receiving data as input into a mobile handheld data processing device, said data comprising information corresponding to an event observed by a user of the device, wherein said data includes a type of event selected from a predetermined set of events, and includes a location of the event, wherein the location of the event is based on GPS-determined location of the mobile handheld data processing device; and
   (b) wirelessly sending from the mobile data processing device to a server, the event type and the location of the event, wherein the server performs an integrity check on the sent data; and
   wherein step (b) further comprises selecting a category of meteorological event and a specific meteorological event in the selected category.

2. The method of claim 1 wherein the event comprises a meteorological condition.

3. The method of claim 1, wherein the input data comprising the location of the event comprises a direction and a distance from a current location of the mobile data processing device.

4. The method of claim 3, wherein the location of the event comprises a latitude and longitude based on the GPS-determined location of the mobile device as offset by the direction and distance from the current location of the mobile data processing device.

5. The method of claim 1, wherein the location of the event is further based on a user-selected position on a map displayed on a display screen of the mobile device, wherein the displayed map is oriented around the GPS location of the mobile device.

6. The method of claim 1, wherein the selected category is selected from groups comprising tornado, precipitation, and lightning.

7. The method of claim 1, wherein the input location of the event is based on a current location of the mobile data processing device.

8. The method of claim 1, further comprising the step of receiving confirmation from the server that the event type and location were successfully transmitted.

9. A computer readable medium storing computer executable instructions for a method for providing information regarding an observed event, comprising steps of:
   (a) receiving computer-readable data comprising information corresponding to a user-observed event as user input, wherein the data includes a type of event and a location of the event, wherein the location of the event is based on a GPS-determined location of an associated mobile data processing device; and
   (b) wirelessly sending from the mobile data processing device to a server, the event type and a location of the event, wherein the server performs an integrity check on the sent data; and
   wherein step (a) further comprises receiving input based on a user selecting a category of event and a specific event in the selected category.

10. The computer readable medium of claim 9, wherein the user-observed event comprises a meteorological event.

11. The computer readable medium of claim 9, wherein the location of the event comprises a direction and a distance from a current location of the mobile data processing device.

12. The computer readable medium of claim 9, wherein the location of the event is further based on a user-selected position on a geographic map displayed on a display screen of the mobile data processing device, wherein the map is oriented on the GPS-determined location of the mobile data processing device.

13. The computer readable medium of claim 9, wherein the selected category is selected from groups comprising tornado, precipitation, and lightning.

14. The computer readable medium of claim 12, wherein the computer executable instructions further comprise:
displaying on a display of the device the geographic map including an icon indicating on the geographic map a present location of the device; and
rotating the displayed geographic map based on a directional orientation of the device so that a direction of travel of the device remains constant with respect to a predetermined position on the display.

15. The computer readable medium of claim 14, wherein the icon maintains a constant position on the display so that the geographic map appears to move underneath the icon.

16. The computer readable medium of claim 14, wherein the predetermined position on the display is the top of the display.

17. The computer readable medium of claim 14, wherein the computer executable instructions control a range of the geographic map, and wherein when a future location of the device is predicted to be within a predetermined distance of a future forecast event not visible on a current range of the geographical map, the device increases the current range of the geographical map so that the icon and the forecast event are both visible in the increased range of the geographical map.

18. The computer readable medium of claim 17, wherein the predetermined distance is zero.

19. The computer readable medium of claim 17, wherein the computer executable instructions extrapolate the future location of the device based on a current direction of travel.

20. The computer readable medium of claim 17, wherein the computer executable instructions determine the future location of the device based on a current road on which the device is traveling.

21. The computer readable medium of claim 9, wherein the device comprises a mobile telephone.

22. The computer readable medium of claim 11, wherein the determined location of the event comprises a latitude and longitude based on the GPS-determined location of the mobile device as offset by the inputted direction and distance from the current location of the mobile data processing device.

23. The computer readable medium of claim 9, wherein the location of the event is based on the location of the mobile data processing device.

24. The computer readable medium of claim 9, wherein the computer executable instructions further comprise the step of receiving confirmation from the sever that the event type and location were successfully transmitted.

25. A mobile data processing device, comprising:
a transceiver for sending and receiving data to and from a data communication network;
a processor for executing computer executable instructions stored in a memory of the device;
said memory storing computer executable instructions for performing an event reporting method comprising steps of:
(a) receiving data as user input into the mobile data processing device, said data comprising information corresponding to an event observed by a user of the device, wherein said data includes a type of event selected from a predetermined set of events, and includes a location of the event, wherein the location of the event is based on a GPS-determined location of the mobile data processing device; and
(b) wirelessly sending from the mobile data processing device to a server via the transceiver the event type and the location of the event, wherein the server performs an integrity check on the sent data; and
wherein step (b) further comprises selecting a category of meteorological event and a specific meteorological event in the selected category.

26. The mobile data processing device of claim 25, wherein the event comprises a meteorological event.

27. The mobile data processing device of claim 25, wherein the input data comprising the location of the event comprises a direction and a distance from a current location of the mobile data processing device.

28. The mobile data processing device of claim 27, wherein the location of the event comprises a latitude and longitude based on the GPS-determined location of the mobile device as offset by the direction and distance from the current location of the mobile data processing device.

29. The mobile data processing device of claim 25, further comprising a display screen, and
wherein the location of the event is further based on a user-selected position on a map displayed on the display screen, wherein the displayed map is oriented around the GPS location of the mobile data processing device.

30. The mobile data processing device of claim 25, wherein the selected category is selected from groups comprising tornado, precipitation, and lightning.

31. The mobile data processing device of claim 25, wherein the input location of the event is based on a current location of the mobile data processing device.

32. The mobile data processing device of claim 25, wherein the computer executable instructions further comprise the step of receiving confirmation from the server that the event type and location were successfully transmitted.

33. A method for providing information regarding an observed event, comprising:
(a) receiving from a mobile data processing device, computer readable data comprising information corresponding to an event visually observed by a user of the mobile data processing device, wherein said data includes a type of event, and includes a location of the event based on a GPS-determined location of the mobile data processing device, wherein the type of event is selected from a predetermined set of event types, wherein the event is chosen from a user-selected event category;
(b) performing an integrity check on the received data; and
(c) displaying on a display device a warning based on the received computer readable data.

34. The method of claim 33, wherein said warning comprises text scrolling across the display device.

35. The method of claim 34, wherein said display device comprises a television.

36. The method of claim 33, wherein step (c) is only performed when the integrity check indicates the received data is valid.

37. The method of claim 34, wherein said text is automatically generated by a data processing device based on the received data.

38. The method of claim 33, further comprising the step of sending confirmation to the mobile data processing device that the event type and location were successfully received.

39. An event warning system, comprising:
a receiver for receiving computer-readable data comprising an event message from a mobile data processing device;
an output system for providing audio output;
a database storing warning message components; and
control logic for selectively combining warning message components based on the received event message, for performing an integrity check on the computer-readable data and for outputting to the output system an audio alert informing a user of the system about an event to which the event message corresponds, wherein the event is chosen from a user-selected category, and wherein a location of the event is determined based on a GPS-determined location of the mobile data processing device.

40. The event warning system of claim 39, wherein the event comprises a meteorological condition.

41. The event warning system of claim 39, wherein the warning message components comprise audio clips.

42. The event warning system of claim 39, wherein the warning message components comprise text strings.

43. The event warning system of claim 42, farther comprising a text-to-speech module for converting the combined text strings into the audio alert.

44. The event warning system of claim 42, farther comprising a display device, and wherein the control logic causes the combined text strings to be displayed on the display device.

45. A handheld data processing device, comprising:
a transceiver for sending and receiving data to and from a data communication network;
a display screen;
a processor for executing computer readable instructions stored in a memory of the handheld data processing device;
said memory storing computer executable instructions for performing an event reporting method comprising steps of:
(a) determining a present location of the handheld data processing device, wherein the present location comprises a GPS-determined location of the handheld data processing device;
(b) displaying on the display screen a geographic map oriented on the present location of the handheld data processing device;
(c) displaying a list of a plurality of event categories and receiving user input selecting one of the plurality of categories;
(d) displaying a list of a plurality of events based on the selected category and receiving user input selecting one of the events;
(e) receiving user input identifying a location of the selected event based on the present location of the handheld data processing device;
(f) sending to a server, via the transceiver, data corresponding to the selected event and identified location, wherein the server performs an integrity check on the sent data; and
(g) receiving confirmation that the data corresponding to the selected event and identified location were successfully sent.

46. The handheld device of claim 45, wherein step (c) comprises displaying the plurality of event categories in a drop down list.

47. The handheld device of claim 45, wherein step (e) comprises receiving user input identifying the location on the geographic map.

48. The handheld device of claim 47, wherein the display screen comprises a touch-sensitive display screen, and step (e) comprises detecting a point on the map touched by a user.

49. The handheld device of claim 45, wherein step (e) comprises receiving user input identifying a direction from the handheld device and a distance from the handheld device.

50. The handheld device of claim 45, wherein the event comprises a meteorological event.

51. The method of claim 1, wherein the server performs the integrity check based on an identification of a user of the mobile data processing device.

52. The method of claim 1, wherein the server performs the integrity check based on a comparison of the data received from the mobile data processing device and data received from one or more other sources.

53. The computer readable medium of claim 9, wherein the server performs the integrity check based on an identification of a user of the mobile data processing device.

54. The computer readable medium of claim 9, wherein the server performs the integrity check based on a comparison of the data received from the mobile data processing device and data received from one or more other sources.

55. The device of claim 25, wherein the server performs the integrity check based on an identification of a user of the mobile data processing device.

56. The device of claim 25, wherein the server performs the integrity check based on a comparison of the data received from the mobile data processing device and data received from one or more other sources.

57. The method of claim 33, wherein the step of performing an integrity check comprises evaluating an identification of a user of the mobile data processing device.

58. The method of claim 33, wherein the step of performing an integrity check comprises comparing the data received from the mobile data processing device and data received from one or more other sources.

59. The system of claim 39, wherein the integrity check is performed based on an identification of the user.

60. The system of claim 39, wherein the integrity check is performed based on a comparison of the data received from the user and data received from one or more other sources.

61. The device of claim 45, wherein the server performs the integrity check based on an identification of a user of the handheld data processing device.

62. The device of claim 45, wherein the server performs the integrity check based on a comparison of the data received from the handheld data processing device and data received from one or more other sources.

* * * * *